Figure 1:
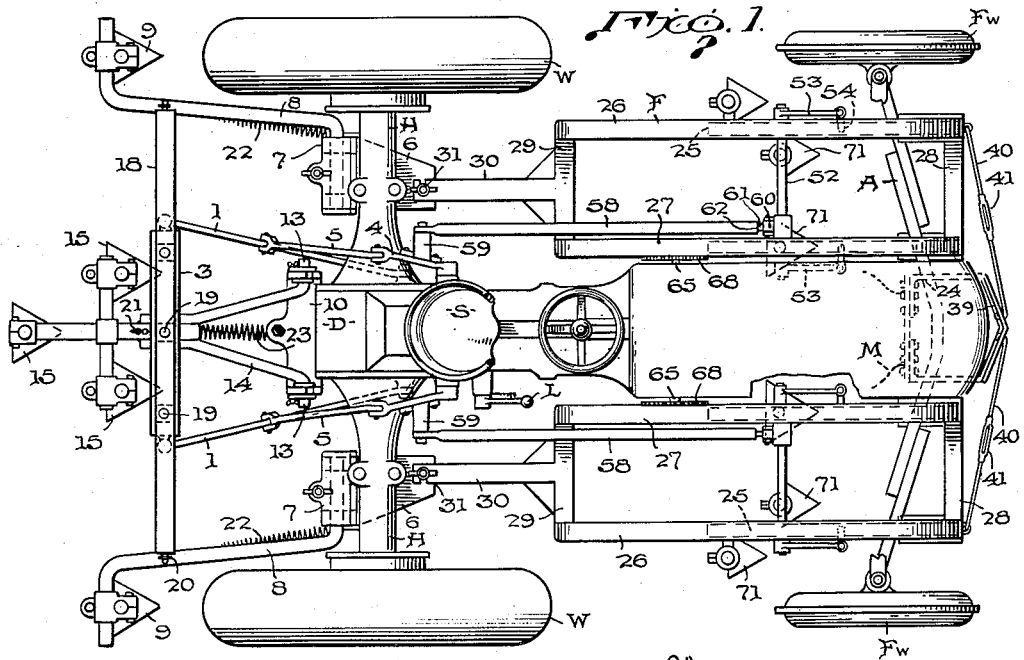

Jan. 27, 1953  J. L. WILLIAMS  2,626,548
RIGID IMPLEMENT FRAME FOR FOUR-WHEELED TRACTORS
Filed March 30, 1950  3 Sheets-Sheet 1

INVENTOR.
JOHN L. WILLIAMS
BY
Ralph B. Stewart
ATTORNEY

Jan. 27, 1953 J. L. WILLIAMS 2,626,548
RIGID IMPLEMENT FRAME FOR FOUR-WHEELED TRACTORS
Filed March 30, 1950 3 Sheets-Sheet 2
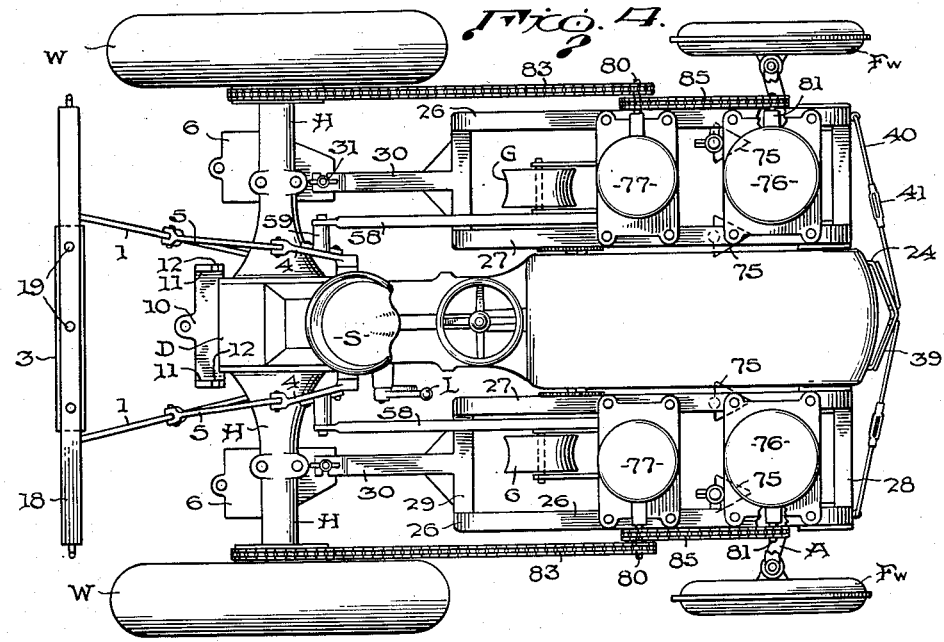
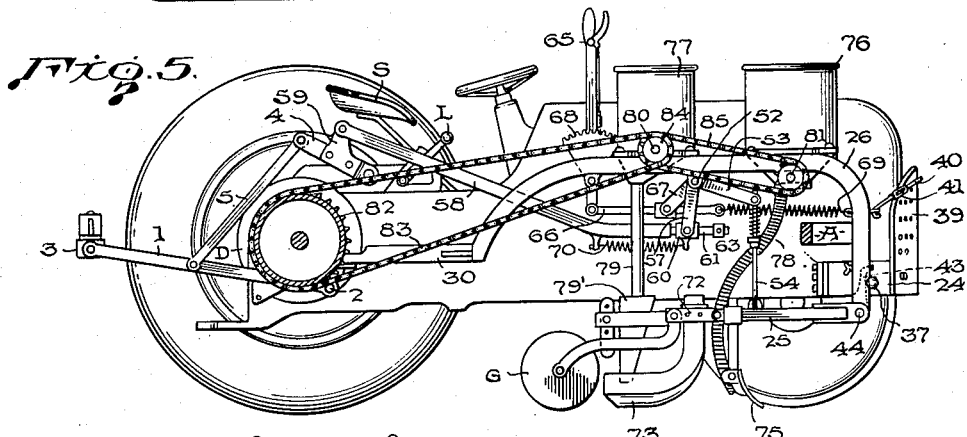
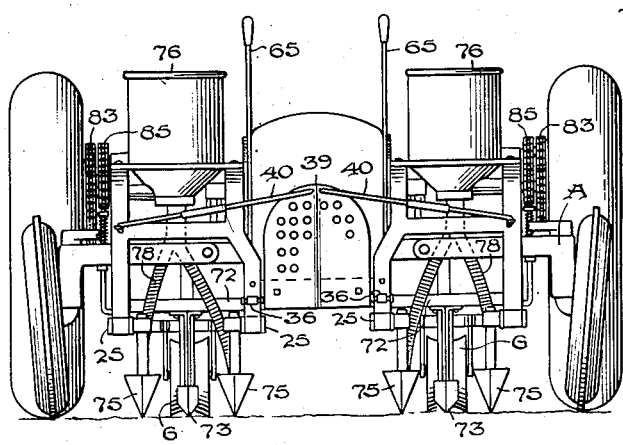
INVENTOR.
JOHN L. WILLIAMS
BY Ralph B. Stewart
ATTORNEY

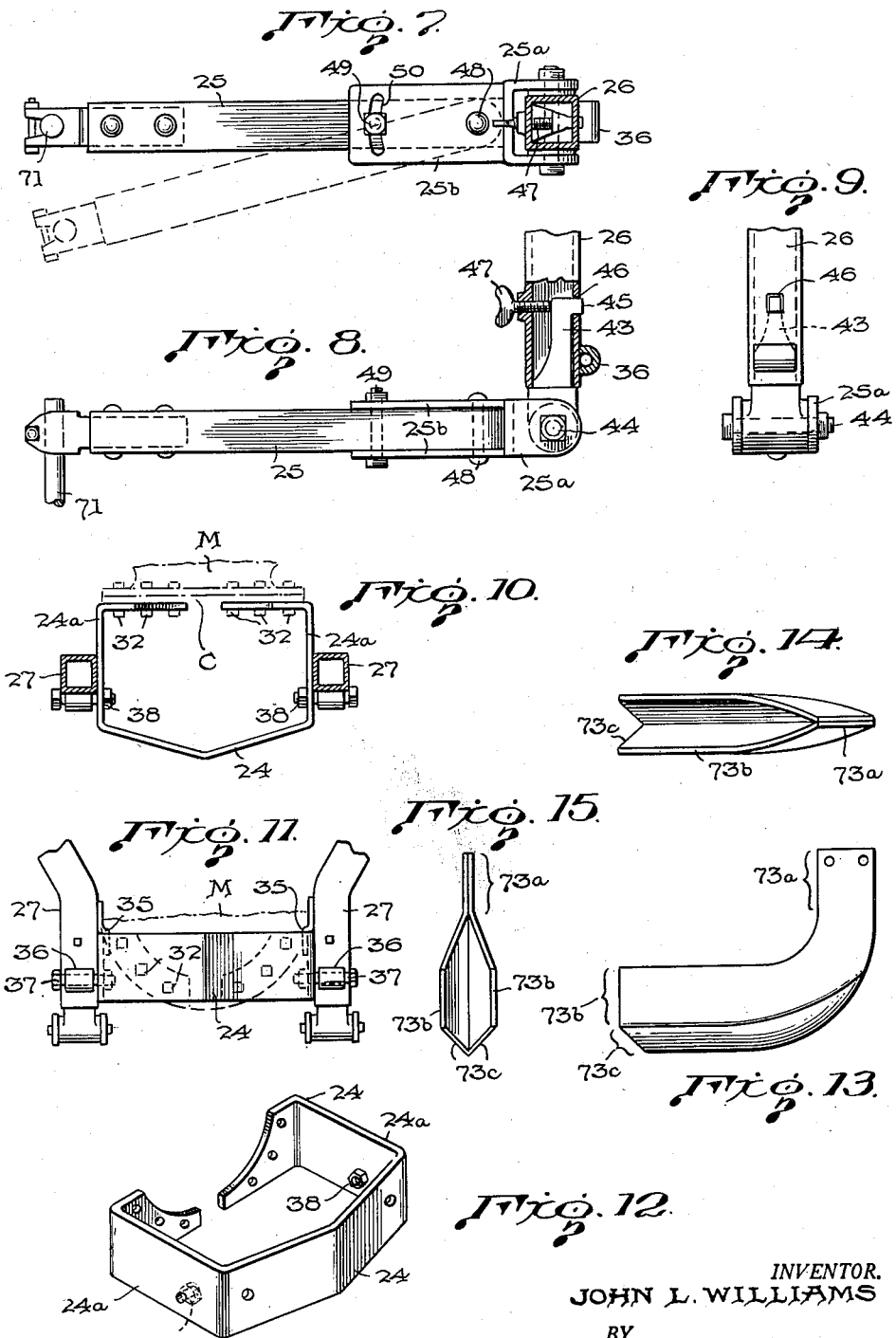

Patented Jan. 27, 1953

2,626,548

UNITED STATES PATENT OFFICE 2,626,548

RIGID IMPLEMENT FRAME FOR FOUR-WHEELED TRACTORS

John Lomar Williams, Jackson, Tenn.

Application March 30, 1950, Serial No. 152,878

11 Claims. (Cl. 97—47)

This invention relates to planting and cultivating attachments for tractors and particularly to the implement supporting and controlling means for operatively mounting implements forwardly of the rear drive wheels of a tractor.

While attachments embodying forwardly disposed implement mounting means have heretofore been known and used, as exemplified in the Mobley Patent 2,230,331, such prior attachments have commonly employed a rigid draft bar or equivalent structure rigidly secured to and extending across the front of the tractor and projecting laterally on opposite sides thereof, the ground engaging implements being connected to and drawn forwardly by said bar, and additional side frame members being provided for supporting the implement control mechanism, seed and fertilizer hoppers and the like.

With the foregoing in mind, it is a primary object of this invention to provide a tractor attachment in which the forward implement mounting means comprises longitudinally extending implement mounting frames separately detachably mounted on opposite sides of the tractor forwardly of the rear axle, the frames being connected to the rear axle housing to transmit a longitudinal thrust from said housing to implements mounted on the frames, which serve to mount both the ground engaging implements and the control means therefor. With such arrangement it will be obvious that the above mentioned forward draft bar is eliminated and its function taken over by the longitudinal frames.

Another object is to support the forward ends of the longitudinal frames upon a part of the tractor which is held rigid with respect to the rear axle housing, such as the engine or motor block, thereby supporting the frames independently of the front axle which usually is mounted for oscillation with respect to the motor block.

It is a further object to provide such a longitudinal frame which, when operatively positioned on the tractor, extends forwardly over the front tractor axle and has one or more depending forward end portions disposed forwardly of said axle and terminating at a level therebelow, the depending portions being provided with means for coupling an implement draft beam thereto, whereby the draft beams may trail rearwardly beneath the front axle and be vertically swingable without interference from the axle within an operative range sufficient to permit retraction of the implements from the ground, and to allow depth regulation thereof in accordance with usual practice.

A further object is to provide a novel quickly detachable coupling between said longitudinal frames and the respective draft beams.

Another object is to provide a mounting for the draft beams which provides for lateral adjustment of the plows or other implements carried by the beams.

A still further object is to provide a novel means of mounting the longitudinal frames on the tractor, whereby they may be quickly and easily applied to and detached from the tractor, and wherein removal of the respective longitudinal frames will render the tractor immediately ready for use with other attachments.

Additional objects are: to couple the depth regulating means of the forwardly mounted implements to the usual power lift mechanism of the tractor for actuation thereby; to provide manually operable control means carried solely by the frames for regulating the implement depth independently of the power lift mechanism; and, where the frames are rigged for use in planting, to provide means permitting clear visual inspection of the passage of seeds from the seed hopper to the usual furrow opener.

In the present application I show and describe only the preferred embodiment of my invention, simply by way of illustration of the practice thereof, as by law required. However I recognize that the invention is capable of other and different embodiments and that the several details thereof may be modified in various ways, all without departing from my invention. Accordingly, the drawings and description herein are to be considered as merely illustrative and not as exclusive.

Figure 2:
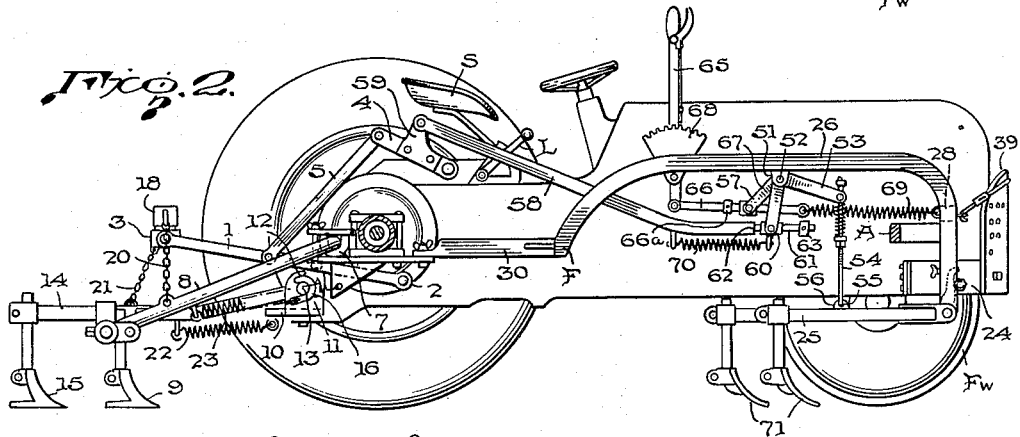
Figure 3:
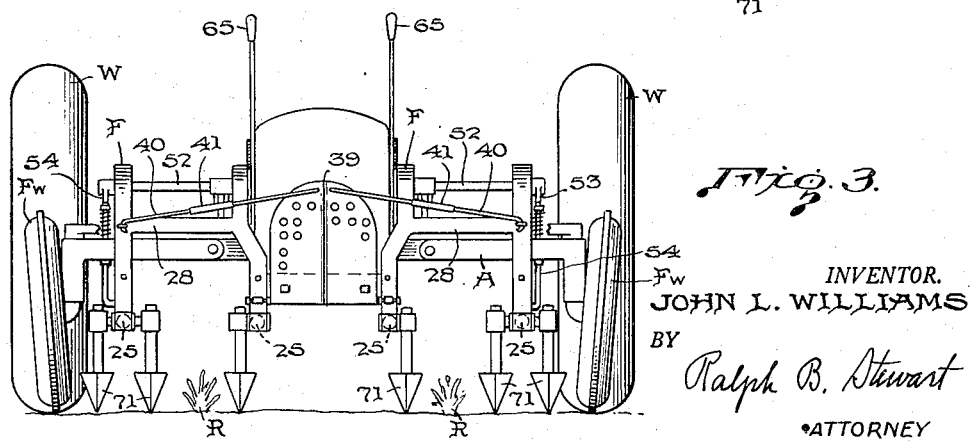

In the accompanying drawings:

Figure 1 represents a plan view of a tractor having my invention applied thereto, and rigged for use as a cultivator;

Figure 2, a side elevation of the tractor of Figure 1, the wheels on one side thereof being removed to permit a clear view of the implement supporting frames and associated structure;

Figure 3, a front elevation of the tractor embodying my invention as illustrated in Figures 1 and 2;

Figure 4, a view similar to Figure 1 showing the tractor and implement supporting frames rigged for use as a planter;

Figure 5, a side elevation of the planter of Figure 4, the tractor wheels on one side being removed as in Figure 2;

Figure 6, a front elevation of the planter shown in Figures 4 and 5;

Figure 7, an enlarged detail plan view of one of the implement draft beams used with the frames of the invention, showing the associated end portion of one of the frames in section;

Figure 8, a side elevation of such a draft beam showing the manner in which it is coupled to the depending forward end of one of the frame elements, the latter being shown only fragmentarily;

Figure 9, a front end elevation of the construction shown in Figure 8;

Figure 10, an enlarged detail plan view showing the manner in which the supporting yoke for the frames is secured to the motor block of the tractor, the associated portions of the frames being shown in horizontal cross-section through the axes of the bolts which secure the frames to the yoke;

Figure 11, a front elevation of the construction illustrated in Figure 10, the associated portions of the frames being illustrated fragmentarily;

Figure 12, a detail perspective view of the frame-supporting yoke and,

Figures 13, 14, and 15 respectively represent enlarged detail side, top and rear end views of furrow openers such as are used with the frames when they are rigged for planting.

Referring now in detail to the accompanying drawings, there is shown in Figures 1, 2 and 3 a usual form of farm tractor having rear drive wheels W, connected through a rear axle housing H and powered by means of a forwardly mounted internal combustion motor M. The letter S designates the operator's seat, and the letter A designates the transversely extending front axle on which are mounted the front wheels FW.

Such a tractor is provided with a power actuated implement lift mechanism, preferably of the well known and widely used hydraulic type as disclosed for example in the U. S. patent to Harry G. Ferguson, No. 2,223,002.

Inasmuch as such power lift mechanism is well known it is only generally described herein. It will be seen that such mechanism comprises a pair of rigid laterally spaced implement supporting levers or links, each designated 1, which are pivotally connected at their forward ends to fixed locations on the tractor, as at 2, for vertical swinging movement, a usual horizontal cross bar 3 extending transversely between the rear ends of these links 1 and being carried thereby.

Power lift arms 4 are carried by the tractor for rotary movement in vertical longitudinal planes on opposite sides of the tractor, to be operated by conventional hydraulic or other power means under the control of a swingable lever L.

Movement is transmitted from the lift arms 4 to the respective implement supporting links 1 by usual lift rods 5, each said rod 5 having its opposite ends respectively pivotally connected to its cooperating link 1 and arm 4 as shown.

Secured beneath the axle housing H on opposite sides of the tractor are rigid metal plates or brackets 6—6, as shown in Figure 1, each of which carries a journal bearing 7 rearwardly of the axle housing H to removably receive and provide a pivotal mounting for a rearwardly extending vertically-swingable implement draft beam 8. Cultivator plows 9 may be carried by these respective draft beams 8 in accordance with known practice.

A further control bracket 10 rigidly secured to the differential housing D medially of the rear axle housing H is provided with laterally spaced upwardly turned ears 11 having upwardly opening bearing recesses 12 respectively formed therein to receive and pivotally support the laterally projecting trunnions 13 of a central draft beam 14 which, if desired, may carry a plurality of cultivating plows or other implements 15. Hooks 16 pivoted to the respective ears 11 and swingable to cover the recesses 12 may provide means for removably retaining the trunnions 13 in operative position.

A lifting bar 18 bolted on top of the cross bar 3, as at 19, is connected to each of the implement draft beams 8, 8 and 14, as by chains 20, 20, and 21, so that the various implements may be simultaneously raised and lowered with the draw bar 3 under the control of lever L.

Preferably hold down springs 22, 22 and 23 disposed under tension between each of the implement draft bars 8, 8 and 14 respectively and fixed locations on the tractor serve to urge the implements resiliently downwardly in accordance with usual practice.

The rear implements, such as plows 9 and 15, are preferably used only when the tractor is rigged for use as a cultivator, as shown in Figures 1, 2 and 3, and are removed when it is rigged for use as a planter as shown in Figures 4, 5 and 6.

Forward implement frames, each generally designated F, are independently detachably mounted on opposite sides of the tractor, each frame being supported between the rear axle housing H and a fixed yoke or other stationary element 24 at the forward end of the tractor. Each frame F has means for mounting one or more implement draft beams 25, preferably for vertical swinging movement, at locations forwardly of and below the front tractor axle A, the arrangement being such that a forward thrust is transmitted from the axle housing H through the frame F to the implements carried thereby when the tractor is in motion. The several draft beams 25 of the frames F trail rearwardly beneath the front axle and may be raised and lowered within their desired operative range without being obstructed by the front axle A.

Each such frame F in the preferred embodiment comprises a pair of inverted, substantially U-shaped rigid metal frame elements 26 and 27 formed of tubular stock, preferably of rectangular cross-section, secured together by rigid front and rear cross pieces or members 28 and 29 respectively, the horizontal medial portions of said frame elements 26 and 27 being preferably disposed at a common level to provide a supporting platform for other attachments, as appearing hereinafter.

Welded or otherwise rigidly secured to the medial portion of the rear cross piece 29 of each such frame is a rearwardly projecting thrust member 30 which may be detachably connected to the axle housing H on its side of the tractor, as by a bolt 31 securing it to the plate or bracket 6 projecting forwardly beneath the housing H.

The downwardly directed forward ends of the respective inner frame elements 27 are preferably inwardly offset somewhat to be secured flush against the side faces of the supporting yoke 24 and thereby support the remaining portions of their respective frames clear of the tractor structure.

The yoke 24 which is utilized in the preferred embodiment to provide a suitable supporting and connecting means between the front ends of the respective frames and the tractor is illustrated in detail in Figures 10, 11 and 12. Said yoke is arranged across the front end of the block of the tractor motor M, and is secured to the block by bolts 32. In the embodiment illustrated, the bolts 32 are identical with the bolts used to secure the front cover plate C onto the motor block (Figure 10).

This yoke 24 is formed of parallel sides 24a projecting forwardly from the motor block, beneath the front axle A and the radiator of the tractor, and a bridging part connecting the forward ends of the side parts and arranged forwardly of the tractor radiator. Thus, the yoke 24 comprises a U-shaped member arranged in front of the engine in a horizontal plane located below the front axle, the ends of the parallel arms or sides of the yoke being secured to the engine block.

The respective inner frame elements 27 of each forward frame are rigidly but detachably connected to the respective opposite sides of the yoke, whereby each frame F will be rigidly supported between the rear axle housing H and yoke 24.

In the illustrated embodiment this is accomplished by providing on the forward downwardly directed end portion of each inner frame element 27 a downwardly directed hook 35 disposed to project across the upper edge of its respective yoke side 24a and downwardly against the inner face thereof.

In order to reinforce such connection and prevent displacement of the frames F in the planes of their respective yoke sides 24a, it is desirable to also bolt each of the frames F to its respective side of the yoke 24. Preferably this is accomplished by welding or otherwise fixedly securing to each inner frame element 27 adjacent its forward end a metal sleeve 36 having its bore extending transversely to said frame element. Bolts 37 may be passed through the respective sleeves 36 and through openings in the yoke sides 24a and into threaded engagement with nuts 38 disposed on the inner faces of the respective yoke sides and preferably welded to the sides, as shown in detail in Figures 10 and 11.

In order to further strengthen the connection and maintain the respective frames F firmly against vertical deflection, I provide an anchor element in the form of a radiator shield 39 of rigid perforated sheet metal which is securely bolted to the front, bridging part of the yoke 24 and projects upwardly therefrom. The outer frame elements 26 of the respective frames are secured to this anchor element 29 by tension braces 40 preferably having turnbuckles 41 interposed therein.

It will be noted that the two implement frames are secured to yoke 24 by independent detachable connections so that the frames may be applied or removed separately.

Preferably the several implement draft beams 25 are detachably connected to the respective frames F, whereby the beams may be quickly removed or replaced, and the implements thereon may be changed or rearranged as required for converting the frames for use in cultivating to use in planting, or vice versa.

I have devised a particularly advantageous connection or coupling for this purpose, as illustrated in detail in Figures 7, 8 and 9, wherein I have shown the depending forward end portion of one of the tubular frame elements 26 by way of example, it being understood that the corresponding end portions of the frame elements 27 will have similar coupling means embodied therein. It will be seen that the free end of element 26 opens downwardly and functions as a socket to receive a coupling element or shank 43 which is pivotally connected as at 44 to the forward end of the implement draft beam 25 by means of a clevis 25a. Each said shank 43 is provided at a point spaced from its lower end with a forwardly extending projection or stud 45 for reception in a recess or opening 46 in the front wall of the socketed frame element 26. The projection 45 may be pressed into recess 46 by a set screw 47 threaded through the rear wall of element 26, the screw 47 having thrusting engagement with the rear face of the shank 43 on the opposite side thereof from the projection 45. The shank 43 may be reversed so that the projection 45 extends rearwardly and the screw 47 will then be threaded through the front wall of member 26.

It will be apparent that by loosening of the set screw 47 and applying pressure against the externally projecting end of the stud 45, the stud can be forced through the opening 46, thereby unlocking the shank 43 and allowing it to drop out of its socket in frame 26; and any draft beam 25 may be operatively connected to its respective end portion of any of the frame elements 26 or 27 in similar manner, by replacing its shank 43 in the socketed end of element 26 or 27 and turning the set screw 47 tight.

The pivotal connection 44 between each draft beam 25 and its shank 43 permits vertical swinging movement of the draft beam as required to regulate the depth of the implements carried thereby and to raise the implements from plowing position; and further, each beam preferably is pivotally mounted at its forward end to permit a limited degree of lateral adjustment of the plow or other implement carried at the rear end of the beam.

Accordingly, and as shown in Figure 7, the front end of the beam is received between a pair of clamping plates 25b—25b and is pivotally connected to these plates by a vertical pivot pin 48 for lateral swinging movement between these plates. A clamping bolt 49 passes through the beam and through arcuate slots 50 in the respective clamping plates near the rear ends thereof, whereby the beam may be clamped in any desired position of lateral adjustment.

Depth adjusting mechanism is carried by each of the frames F to regulate the operating depth or vertical position of the respective implement draft beams 25 and the implements carried thereby. Such depth adjusting mechanism, as embodied in each of the frames, will preferably comprise a rock shaft 52 journalled across the frame between bearings 51—51 mounted medially of the length of the frame elements 26, 27, respectively. Such a rock shaft 52 has cranks 53—53 rotatable therewith and operatively connected to the respective implement draft beams 25 by pitmans 54—54. Preferably the pivotal connection between each pitman 54 and its draft beam 25 is rendered easily detachable, as by forming the lower end of each pitman 54 as a hook 55 which is readily inserted and removed from an eyeleted bracket 56 carried by the draft bar 25. It will thus be apparent that rocking or partial rotation of the rock shaft 52 of either frame F will act through the cranks 53 and pitmans 54 to raise or lower the draft beams 25 and the implements carried thereby.

Rocking or rotary movement is imparted to each rock shaft 52 through a crank 57 fixed thereto and a rigid connecting rod 58 operatively connecting said crank 57 to auxiliary lift arms 59 bolted or otherwise firmly secured to the power lift arms 4 of the tractor.

Thus it will be seen that the power lift arms 4 of the tractor are operably under the control of the lever L to raise or lower the several draft beams 25 carried by the forward implement frames F, as well as the several rear draft beams 8, 8 and 14, which are employed when the tractor is rigged as a cultivator, as shown in Figures 1, 2 and 3.

In use of the tractor for cultivating, it may be desirable to operate the forward implements at a different depth than the rear implements, and I therefore provide a manual control means operable to raise or lower the forward implements independently of the rear implements, without destroying the operative connection of all of said implements to the power lift mechanism.

To this end, the connection between the connecting rod 58 and crank 57 of each frame F is formed to permit a certain amount of lost motion between these parts. Accordingly, and as shown in Figure 2, such a connection may be defined by a sleeve 60 pivoted to the free end of the crank 57 and slidable on a reduced portion 61 of the connecting rod 58 between the fixed shoulder or abutment 62 at one end of said reduced portion and a collar 63 which is preferably adjustable to any desired position on said reduced portion 61. Such a lost motion connection will permit a range of rocking movement of the shaft 52 independently of the connecting rod 58 within the range of lost motion permitted the sleeve 60.

A manually operable hand lever 65 pivotally mounted on each frame F is connected through a link 66 with a crank 67 fixed on the rock shaft 52, to rotate the shaft within the range permitted by said lost motion connection, and thereby adjust the depth of the forward implements accordingly. The connection between crank 67 and link 66 is by a sliding sleeve mounted on link 66 and pivoted to the end of crank 67, and a collar 66a adjustably mounted on link 66 engages the sleeve to rotate shaft 52 in an anti-clockwise direction. This arrangement permits the forward implements to be raised by the power lift regardless of the setting of hand lever 65. In accordance with usual practice the hand lever 65 may be locked in any of its various positions by means of a usual detent mechanism engageable with the toothed edge of a quadrant plate 68 fixed to each frame.

A tension spring 69 extending between the link 66 and the forward frame across piece 28 of each frame F counterbalances the force of an implement hold down spring 70 disposed under tension between the sleeve 60 and connecting rod 58 and thereby facilitates the manual depth adjustment of the forward implements.

Various implements or attachments may be mounted on the implement draft beams 25. In Figures 1, 2 and 3 wherein the tractor and the implement supporting frames are rigged for use as a cultivator, the forward draft beams each carry usual cultivator implements or plows 71 which are preferably arranged to cultivate the ground immediately adjacent the crop rows R (Figure 3), these being offset laterally relative to the various rear cultivator implements 15 which are arranged to cultivate in paths medially between the crop rows R. Obviously, through manual actuation of the hand levers 65, the forward implements 71 may be set for shallow cultivation adjacent the crop rows R, while the rear implements may be disposed for relatively deep cultivation between the rows R.

In Figures 4, 5 and 6, the tractor is shown with its forward implement frames and attachments as it will appear when rigged for use as a planter. In this arrangement, the rear cultivator implements are preferably removed, and the two implement draft beams 25 of each forward frame F are connected by a cross piece 72 which supports a press wheel G in rolling engagement with the ground, and a usual furrow opener 73 in advance of said press wheel G. Cultivator implements 75—75 are carried by the respective beams 25—25 on opposite lateral sides and in advance of the furrow opener 73 to open furrows or trenches for receiving fertilizer.

Each frame F carries fertilizer hopper 76 and a seed hopper 77 mounted on the horizontal platform provided by the parallel horizontal medial portions of its respective frame elements 26 and 27 and bolted in place as shown. The fertilizer hopper 76 of each frame is disposed forwardly of the seed hopper 77 and discharges fertilizer through a flexible tube 78—78, the discharge ends of which are located rearwardly of and in alignment with the respective implements 75—75 to discharge fertilizer into the trenches opened thereby, on opposite sides of the seed furrow.

The seed hopper 77 of each frame discharges seeds through a tube 79 into funnel 79' which in turn discharges the seeds into the furrow opener 73. A particularly advantageous feature resides in forming the seed tubes 79 of a non-frangible, resilient, transparent, plastic material. Suitable material for feed tubes 79 would be synthetic resins of the type sold under the trade name "Lucite." Such a tube 79 is adapted to withstand the jolting and flexing occasioned by movement of the tractor and rough engagement with the funnel 79' or other parts of the tractor equipment, but at the same time will permit a constant visual check of the seeder operation to be made by the tractor operator from his seat S.

The details of the furrow opener 73 are shown in Figures 13, 14 and 15. The opener is of L shape with one arm extending vertically and the other in a horizontal trailing position. It may be formed of two L-shaped metal plates having the upper end portions of the vertical arms joined together in face to face contact as shown at 73a, and below this point the two plates are formed in two spaced, parallel sections 73b, 73b, and these two sections are joined along their lower edges by a pair of inclined wall sections 73c, 73c. This construction provides a horizontal trough, with an open rear end, into which the seeds are fed by seed funnel 79'.

The seed hopper 77 of each frame has a conventional distributing mechanism or valve controlled by rotation of a shaft 80 journalled on its base, while the fertilizer hopper 76 of each frame similarly has a conventional distributing valve controlled through rotation of a shaft 81 journalled on its base.

Rotary movement is transmitted to each seed distributor shaft 80 from a sprocket wheel 82 rotatable with the drive wheel W on its side of the tractor through a sprocket chain 83 and a sprocket wheel 84 keyed on said shaft 80. A further chain 85 transmits rotation from the seeder shaft 80 to the fertilizer distributor shaft 81 through usual sprocket wheels fixed on said shafts 80 and 81.

Thus in the operation of the tractor when rigged for planting, it will be apparent that the plows or implements 75 will open parallel trenches to receive fertilizer from the hoppers 76 and the furrow openers 73 will open furrows between these trenches to receive seeds from the hoppers 77.

In the use of the invention, the longitudinal frames F may be separately removed from or applied to the tractor. In applying each frame, the implement draft beams 25 are preferably first detached therefrom and each frame is then lifted into operative position on its side of the tractor and its forward hook 35 engaged over the upper side edge of the yoke 24. This will support the front end of the frame while the rear thrust element 30 thereof is bolted to the plate 6 beneath the axle housing H. The front end of the frame is then bolted to the yoke 24, as in Figures 10 and 11, and the tension braces 40—40 secured in place and tightened if necessary through rotation of the turnbuckles 41.

Following this, the implement draft beams 25 with the desired implements secured thereon are attached to the forward ends of the respective frame elements 26 and 27 in the manner heretofore described, and the connecting rods 54 of the depth control mechanisms are connected to these respective beams 25.

Where the seeder and fertilizer hoppers 77 and 76 are to be used, these may be mounted on the frame elements 26—27 of each frame in obvious manner.

To remove the frames and implements from the tractor, the aforementioned steps are simply reversed, only the yoke 24 and plates 6—6 being left in position, whereupon the tractor may be employed for other usual purposes without interference from these remaining parts 6 and 24.

I claim:

1. In a tractor of the class having rear drive wheels powered by a forwardly mounted motor, a rigid rear axle housing being interposed between the said rear wheels, and a front axle extending transversely across the tractor to support the front wheels thereof, the combination with said tractor of a rigid yoke secured to said motor below said front axle, separate unitary implement supporting frames extending longitudinally on opposite sides of said tractor, means detachably connecting the front end of each said frame to said yoke, means for detachably but rigidly connecting the rear end of each frame to said rear axle housing to receive a longitudinal thrust from the axle housing when the tractor is in motion, said frames extending above the front tractor axle and having forward ends disposed in advance of and depending below said axle, and implement draft beams connected to said depending forward frame ends and extending rearwardly therefrom beneath said front axle.

2. In a tractor of the class having rear drive wheels powered by a forwardly mounted motor, a rigid rear axle housing being interposed between said rear wheels, and a front axle extending transversely across said tractor, the combination with said tractor of a rigid yoke secured to said motor, a rigid unitary implement supporting frame supported on and extending longitudinally on one side of said tractor, said frame comprising a pair of relatively spaced longitudinal frame elements of substantially inverted U-shape, a cross piece extending between and connecting the depending rear ends of said elements, a rigid longitudinal thrust element connecting said cross piece to said rear axle housing to support the rear end of said frame in a manner whereby a forward thrust will be transmitted therethrough from said axle housing when the tractor is in motion, the front end of said frame being detachably secured to and supported by said yoke, the medial portions of said frame elements being disposed at a common level and extending above the front axle of the tractor, the depending forward ends of said elements being disposed forwardly of and projecting below said axle, and vertically swingable implement draft beams pivotally connected to said respective forward ends and extending rearwardly therefrom beneath said front axle.

3. A tractor implement mounting frame comprising a pair of relatively spaced, substantially parallel, rigid frame elements of substantially inverted U-shape, a rigid cross piece extending between the respective depending rear ends of said elements, a rigid thrust member projecting rearwardly from said cross piece in a direction substantially parallel to said elements, and adapted for connection to the rear axle housing of a tractor, the forward end of said frame being adapted for connection to the tractor, and implement draft beams respectively carried by the depending forward ends of said frame elements.

4. In a tractor of the class having rear drive wheels between which is disposed a rear axle housing, and a transversely disposed front axle pivoted at its center to a fixed part of the tractor, the combination with said tractor of a rigid, unitary implement supporting frame extending longitudinally on one side of said tractor, means for detachably but rigidly connecting the rear end of said frame to said rear axle housing to receive a longitudinal thrust from the axle housing when the tractor is in motion, said frame having an intermediate portion extending above the front tractor axle and forwardly of said axle, the forward end portion of said frame extending downwardly from said intermediate portion in front of said axle, means at the lower end of said downwardly extending forward end portion for detachably securing said forward end portion to a fixed portion of the tractor structure located below said front axle, and means carried by said forward end portion at the lower end thereof for coupling an implement draft beam thereto.

5. In a tractor of the class having rear drive wheels between which is disposed a rear axle housing, a driving motor arranged at the front of the tractor, and a transversely disposed front axle pivoted at its center to a fixed part of the tractor, the combination with said tractor of a rigid, unitary implement supporting frame extending longitudinally on one side of said tractor, means for detachably but rigidly connecting the rear end of said frame to said rear axle housing to receive a longitudinal thrust from the axle housing when the tractor is in motion, said frame having an intermediate portion extending above the front tractor axle and forwardly of said axle, the forward end portion of said frame extending downwardly from said intermediate portion in front of said axle, a rigid yoke secured to the block of said motor at the front end of the motor and below said front axle, and means at the lower end of said downwardly extending forward end portion for detachably securing said forward end portion to said yoke.

6. In a tractor of the class having rear drive wheels between which is disposed a rear axle housing, a driving motor arranged at the front of the tractor, and a transversely disposed front axle pivoted at its center to a fixed part of the tractor, the combination with said tractor of a pair of rigid, unitary implement supporting frames extending longitudinally of said tractor on opposite sides thereof, means for detachably but rigidly connecting the rear ends of said frames to said rear axle housing to receive a longitudinal thrust from the axle housing when the tractor is in motion, each of said frames having an intermediate portion extending above the front tractor axle and forwardly of said axle, the forward end portion of each frame extending downwardly from the intermediate portion in front of said axle, a U-shaped yoke arranged in front of said motor below said front axle and having the ends of its parallel arms secured to the block of said motor, and means at the lower end of the downwardly extending forward end portion of each frame for detachably securing said forward end portions to the opposite side arms of said yoke.

7. A combination according to claim 6 and including a tension brace connected between the forward end portions of said frames near the upper ends thereof.

8. In a tractor of the class having rear drive wheels between which is disposed a rear axle housing, and a transversely disposed front axle pivoted at its center to a fixed part of the tractor, the combination with said tractor of a rigid, unitary implement supporting frame extending longitudinally on one side of said tractor, said frame having an intermediate portion arranged alongside of said motor above the front tractor axle and extending forwardly of said axle, said intermediate frame portion being formed to provide a horizontal surface for supporting containers of materials to be distributed, said frame including a rigid rear portion extending downwardly and rearwardly from said intermediate portion, means for detachably but rigidly connecting the end of said rear frame portion to said rear axle housing to receive a longitudinal thrust from the axle housing when the tractor is in motion, said frame having a forward end portion extending downwardly from said intermediate portion in front of said axle, and means at the lower end of said downwardly extending forward end portion for detachably securing said forward end portion to a fixed portion of the tractor structure located below said front axle.

9. In a tractor of the class having rear drive wheels between which is disposed a rear axle housing, and a transversely disposed front axle pivoted at its center to a fixed part of the tractor, the combination with said tractor of a rigid, unitary implement supporting frame extending longitudinally on one side of said tractor, said frame having an intermediate portion arranged alongside of said motor above the front tractor axle and extending forwardly of said axle, said intermediate frame portion being formed to provide a horizontal surface for supporting containers of materials to be distributed, said frame including a rigid rear portion extending downwardly and rearwardly from said intermediate portion, means for detachably but rigidly connecting the end of said rear frame portion to said rear axle housing to receive a longitudinal thrust from the axle housing when the tractor is in motion, said frame having a forward end portion extending downwardly from said intermediate portion in front of said axle, means at the lower end of said downwardly extending forward end portion for detachably securing said forward end portion to a fixed portion of the tractor structure located below said front axle, and a plow beam pivotally connected to the lower end of the downwardly extending forward portion of said frame and extending rearwardly beneath said front axle.

10. In a tractor of the class having rear drive wheels powered by a forwardly mounted motor, a rigid rear axle housing being interposed between said rear wheels, and a front axle extending transversely across said tractor, the combination with said tractor of a rigid unitary implement supporting frame supported on and extending longitudinally on one side of said tractor, said frame comprising a pair of relatively spaced longitudinal frame elements of substantially inverted U-shape, a cross-piece extending between and connecting the depending rear ends of said elements, a rigid longitudinal thrust element connecting said cross-piece to said rear axle housing to support the rear end of said frame in a manner whereby a forward thrust will be transmitted therethrough from said axle housing when the tractor is in motion, the medial portions of said frame elements being disposed in parallel relation in a common horizontal plane and extending over the front axle of the tractor, the forward end portions of said longitudinal frame elements being turned downwardly in front of said axle and projecting below said axle, a second cross-piece extending between and rigidly connecting the front end portions of said longitudinal elements, and means located below said front axle for detachably securing the lower end of the downwardly extending forward end portion of said frame to a rigid part of said motor.

11. A tractor implement mounting frame to be mounted along one side of a tractor comprising, a pair of relatively spaced, substantially parallel, rigid frame elements of substantially inverted U-shape, a rigid cross-piece extending between the respective depending rear ends of said elements, a rigid thrust member projecting rearwardly from said cross-piece in a direction substantially parallel to said elements, and adapted for connection to the rear axle housing of a tractor, a second rigid cross-piece extending between and rigidly connecting the depending front end portions of said elements, and means carried at the lower end of one of said depending front end portions for detachably connecting said frame to said tractor.

JOHN LOMAR WILLIAMS.

REFERENCES CITED

The following references are of record in the file of this patent:

UNITED STATES PATENTS

| Number | Name | Date |
|---|---|---|
| 702,114 | Poindexter | June 10, 1902 |
| 745,671 | Roby | Dec. 1, 1903 |
| 1,471,138 | Brown | Oct. 16, 1923 |
| 1,671,507 | Boldt | May 29, 1928 |
| 1,872,236 | Brown | Aug. 16, 1932 |
| 1,906,431 | Strehlow | May 2, 1933 |
| 2,197,369 | Strasser et al. | Apr. 16, 1940 |
| 2,423,148 | Johnson | July 1, 1947 |